(12) United States Patent
Ali

(10) Patent No.: US 9,169,379 B2
(45) Date of Patent: Oct. 27, 2015

(54) AQUEOUS TWO-PHASE SYSTEMS

(71) Applicant: KING FAHD UNIVERSITY OF PETROLEUM AND MINERALS, Dhahran (SA)

(72) Inventor: Shaikh Asrof Ali, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 367 days.

(21) Appl. No.: 13/942,635

(22) Filed: Jul. 15, 2013

(65) Prior Publication Data

US 2015/0018475 A1 Jan. 15, 2015

(51) Int. Cl.
*C08L 29/04* (2006.01)
(52) U.S. Cl.
CPC ..................................... *C08L 29/04* (2013.01)
(58) Field of Classification Search
CPC ...................................................... C08L 29/04
USPC ......................................................... 524/503
See application file for complete search history.

(56) References Cited

U.S. PATENT DOCUMENTS

| 7,553,658 | B2 | 6/2009 | Kepka et al. |
| 7,803,405 | B2 | 9/2010 | Keating et al. |
| 8,192,942 | B2 | 6/2012 | Koo et al. |
| 8,263,343 | B2 | 9/2012 | Hallgren et al. |

OTHER PUBLICATIONS

Al-Muallem, Hassan A. et al., "Synthesis and Solution Properties of a New Ionic Polymer and its Behavior in Aqueous Two-Phase Polymer Systems", Polymer, 43, 1041-1050, 2002.
Ali, Shaikh Asrof, "Phase Diagrams of Urethanized Polyvinyl Alcohol with a Series of Hydrophobically Modified pH-Responsive Polymers Containing Amino Acid Residues", Korean Journal of Chemical Engineering, 29(10), 1426-1437, Oct. 2012.
Sakurada, Ichiro et al., "Dilute Solution Properties of Partly Urethanized Polyvinyl Alcohol", Journal of Polymer Science Part A: General Papers, 2(8), 3545-3556, 1964.
Umar, Yunusa et al., "Synthesis and Solution Properties of Hydrophobically Associating Ionic Polymers Made ftom Diallylammonium Salts/Sulfur Dioxide Cyclopolymerization", Polymer, 45(11), 3651-3661, 2004.
Waziri, Saidu M. et al., "Protein Partitioning in Aqueous Two-Phase Systems Composed of a pH-Responsive Copolymer and Poly(ethylene glycol)", Biotechnology Progress, 20(2), 526-532, 2004.

*Primary Examiner* — Edward Cain
(74) *Attorney, Agent, or Firm* — Richard C. Litman

(57) ABSTRACT

The aqueous two phase systems (ATPS) contain partly urethanized PVA (polyvinyl alcohol) and hydrophobically modified cyclocopolymers formed from the monomers diallylammonioethanoate, 0-3 mol % dodecyldiallylammonium chloride and sulphur dioxide, the copolymers having varying proportions of polybetaine (PB) and anionic polyelectrolyte (APE) fractions. The aqueous two-phase systems are useful in the separation and purification of biomaterials.

10 Claims, 10 Drawing Sheets

AQUEOUS TWO-PHASE SYSTEMS

BACKGROUND OF THE INVENTION

1. Field of the Invention

The present invention relates to extraction solvents, and particularly to aqueous two phase systems that contain partly urethanized PVA (polyvinyl alcohol) and a copolymer formed from the monomers diallylammonioethanoate, dodecyldiallylammonium chloride and sulphur dioxide that can be used for the extraction of biomolecules of interest.

2. Description of the Related Art

Aqueous solutions of appropriate concentrations of two polymers, a polymer and a salt, or other alternative components, when combined above or below a certain critical temperature, lead to the construction of biphasic systems known as aqueous two-phase systems (ATPS). ATPS, having the advantage to be readily scaled-up, are efficient, inexpensive, environmentally friendly and biocompatible liquid-liquid extraction systems that have been widely used to separate and purify a variety of industrially important biomolecules. Unequal distribution of biomolecules, such as amino acids and proteins, in ATPS leads to the efficient separation and purification of the biomolecules in downstream processes of biotechnology.

The most commonly used ATPS are based on poly(ethylene glycol) (PEG) and dextran. In some cases, the polymers have been modified with hydrophobic groups and biospecific ligands for the affinity partitioning of biomolecules. The efficient use of a hydrophobically modified acrylamide-styrene copolymer-PEG aqueous two-phase system in the separation of bovine serum albumin has been demonstrated.

In an effort to develop suitable ATPS, the effect of pH and salt concentration on the coexistence curves of a system containing the pH-responsive copolymer poly(diallylammonioethanoate-alt-sulfur dioxide) and polyethylene glycol has been reported. The system has been successfully employed in the study of protein partitioning; extremely high partitioning levels (partition coefficient of 0.004) and very high separation ratios of bovine serum albumin and cytochrome c (up to 48) were recorded. Hydrophobicity is a key feature that determines the partitioning of proteins in ATPS.

Thus, aqueous two-phase systems solving the aforementioned problems is desired.

SUMMARY OF THE INVENTION

The aqueous two phase systems (ATPS) contain partly urethanized PVA (polyvinyl alcohol) and hydrophobically modified cyclocopolymers formed from the monomers diallylammonioethanoate, 0-3 mol % dodecyldiallylammonium chloride and sulphur dioxide, the copolymers having varying proportions of polybetaine (PB) and anionic polyelectrolyte (APE) fractions. The aqueous two-phase systems are useful in the separation and purification of biomaterials.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
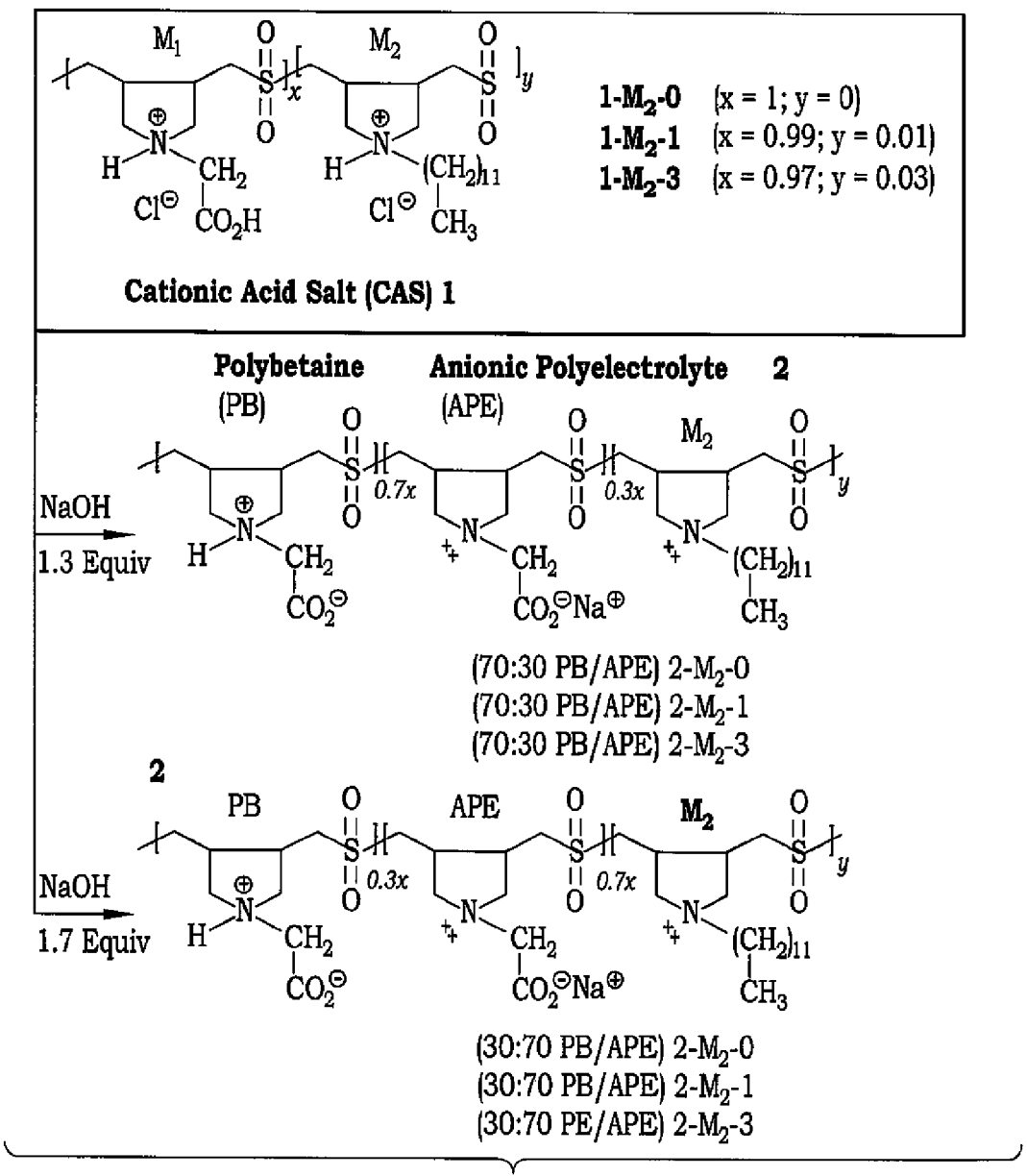
FIG. 1A shows a Cationic Acid Salt (CAS) 1 and the synthesis scheme of Polybetaine/Anionic Polyelectrolyte (PB/APE) cyclocopolymers 2.

The aqueous two phase systems (ATPS) contain partly urethanized PVA (polyvinyl alcohol) and hydrophobically modified cyclocopolymers formed from the monomers diallylammonioethanoate, 0-3 mol % dodecyldiallylammonium chloride and sulphur dioxide, the copolymers having varying proportions of polybetaine (PB) and anionic polyelectrolyte (APE) fractions. The aqueous two-phase systems are useful in the separation and purification of biomaterials.

The phase diagram data of a variety of new ATPS involving pH-responsive hydrophobically modified cyclocopolymers of diallylammonioethanoate/sulphur dioxide 2 having varying proportions of polybetaine (PB) and anionic polyelectrolyte (APE) fractions and urethanized polyvinyl alcohol (UPVA) 4 are presented. The cyclocopolymer 2 is expected to be a promising candidate for the construction of recycling ATPS, since the pH-responsive polymer can be precipitated at lower pH values by its conversion to the water-insoluble salt 1. The amino acid residues in the copolymer 2 mimic such biomolecules as proteins, and as such, the ATPS may be used in bioseparation involving monomeric amino acids or proteins.

Polyvinyl alcohol (PVA), with its free hydroxyl groups, offers considerable latitude for chemical transformations such as esterification, etherification and acetylization. It has been established that partly urethanized PVA (UPVA) is more stable than PVA and is readily soluble in solvents, such as water, DMF and DMSO. To my knowledge the UPVA has never been reported as a component for the construction of ATPS.

Example 1

Synthesis of Cationic Acid Salts (CAS) $1-M_2-0$, $1-M_2-1$ and $1-M_2-3$

The synthesis of polymers poly[(diallylammonioethanoate-alt-sulfur dioxide)-ran-(diallyldodecylammonium chloride-alt-sulfur dioxide)], also described as Cationic Acid Salt 1 (CAS) $1-M_2-0$, $1-M_2-1$ and $1-M_2-3$ (shown in FIG. 1A), containing 0, 1 and 3 mol % of the hydrophobic monomer $M_2$ (diallyldodecylammonium chloride), respectively, has been reported by Umar, Y. et al., Polymer, 45, 3651-3661 (2004). These polymers have similar weight average molar masses of around $1.86 \times 10^5$ g/mol and intrinsic viscosities $[\eta]$ of ~1.0 dL/g for the anionic form of 2 (shown in FIG. 1A) having a polybetaine (PB)/anionic polyelectrolyte (APE) ratio of 0:100.

Example 2

Synthesis of Polybetaine/Anionic polyelectrolyte (PB/APE) 2 cyclocopolymers

PB/APE 2 cyclocopolymers, $2-M_2-0$, $2-M_2-1$ and $2-M_2-3$, having various proportions of polybetaine (PB) and anionic polyelectrolyte (APE) and 0, 1 and 3 mol % of the hydrophobic monomer $M_2$ (diallyldodecylammonium chloride) are obtained via neutralization of Cationic Acid Salt (CAS) 1 with 1.3 equiv. or 1.7 equiv. of NaOH (FIG. 1A).

Example 3

Synthesis of Partly (10%) urethanized PVA (UPVA 4)

Figure 1B:
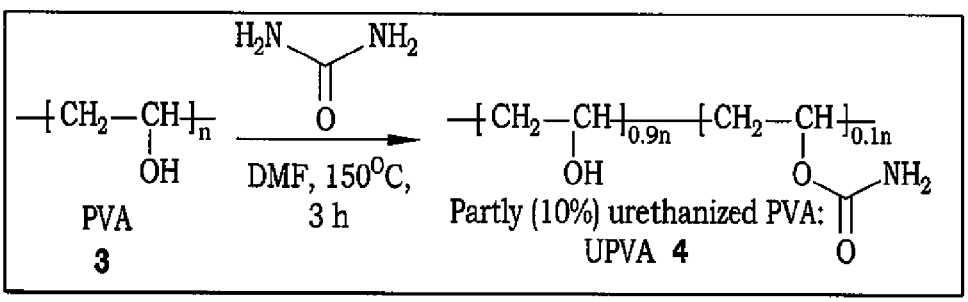
FIG. 1B shows the synthesis of partly (10%) urethanized PVA (UPVA) 4.

PVA 3 with a number average molecular weight of 72000, a degree of hydrolyzation of 97.5-99.5 mol % and a degree of polymerization of 1,600 was purchased from Fluka Chemie AG (Buchs, Switzerland). Partly urethanized PVA (UPVA 4) was prepared by adding urea to PVA in DMF at about 150° C. for 3 h (FIG. 1B). The degree of urethanization and molar mass of the UPVA were estimated to be around 10 mol % of the repeating units and 68,000 g/mol, respectively. The urethanization process is known to be accompanied by some chain cleavage.

Example 4

Phase Compositions and Phase Diagram of UPVA 4-[CAS 1+1.3 or 1.7 equiv NaOH]—$H_2O$ (0.1 or 0.4 N NaCl) System The NMR method for determination of the polymer concentrations of the two phases in equilibrium with each other is carried out as follows. A stock solution of 20% w/w of UPVA 4 (molar mass of the repeating unit 48.35) was prepared in salt-free water. The stock solutions of (70:30 PB/APE) 2 and (30:70 PB/APE) 2 were made by treating $CAS.H_2O$ 1 ($1-M_2-0$) (11-20% w/w) (molar mass of repeating unit 273.73) or $1-M_2-1$ (molar mass 274.65), or $1-M_2-3$ (molar mass 276.50) with 1.3 and 1.7 equivalents of NaOH, respectively. One equivalent of NaOH would be required to neutralize a CAS 1 sample to give PB/APE 2 with a PB/APE ratio of ~100:0, which, in turn, also generates 1 equivalent of NaCl. Further addition of NaOH (0.3 and 0.7 equivalent) would change the (100:0 PB/APE) 2 to cyclocopolymers (70:30 PB/APE) 2 and (30:70 PB/APE) 2 containing a mixture of zwitterionic and anionic units in a respective ratio of 70:30 and 30:70 (FIG. 1A). A set of total systems of a volume of ~7 $cm^3$ was prepared by using the stock solutions of UPVA 4 and PB/APE 2 (i.e. 1.3 or 1.7 equiv NaOH-treated CAS-1). The salt concentration in the total systems was kept at 0.1 N or 0.4 N NaCl by adding additional solid salt (NaCl) when required. The determination of the final salt (NaCl) concentration took into account the NaCl produced from the neutralization reaction.

The mixtures of the total systems after thorough shaking were centrifuged for a period of 10 min to ensure a complete phase separation and kept at 23° C. for 24 h. The volume and the density of the top layers (~1.03 $g/cm^3$) and bottom layers (~1.07 $g/cm^3$) were measured. The $^1H$ NMR spectra of the top and bottom layers were measured after exchanging $H_2O$ with $D_2O$. The $^1H$ NMR spectra of (a) PVA 3, (b) UPVA 4, (c) a sample from the bottom phase of system 1, and (d) a sample from top phase of system 4 are displayed in FIGS. 2A, 2B, 2C and 2D.

Figures 2A, 2B, 2C, 2D:
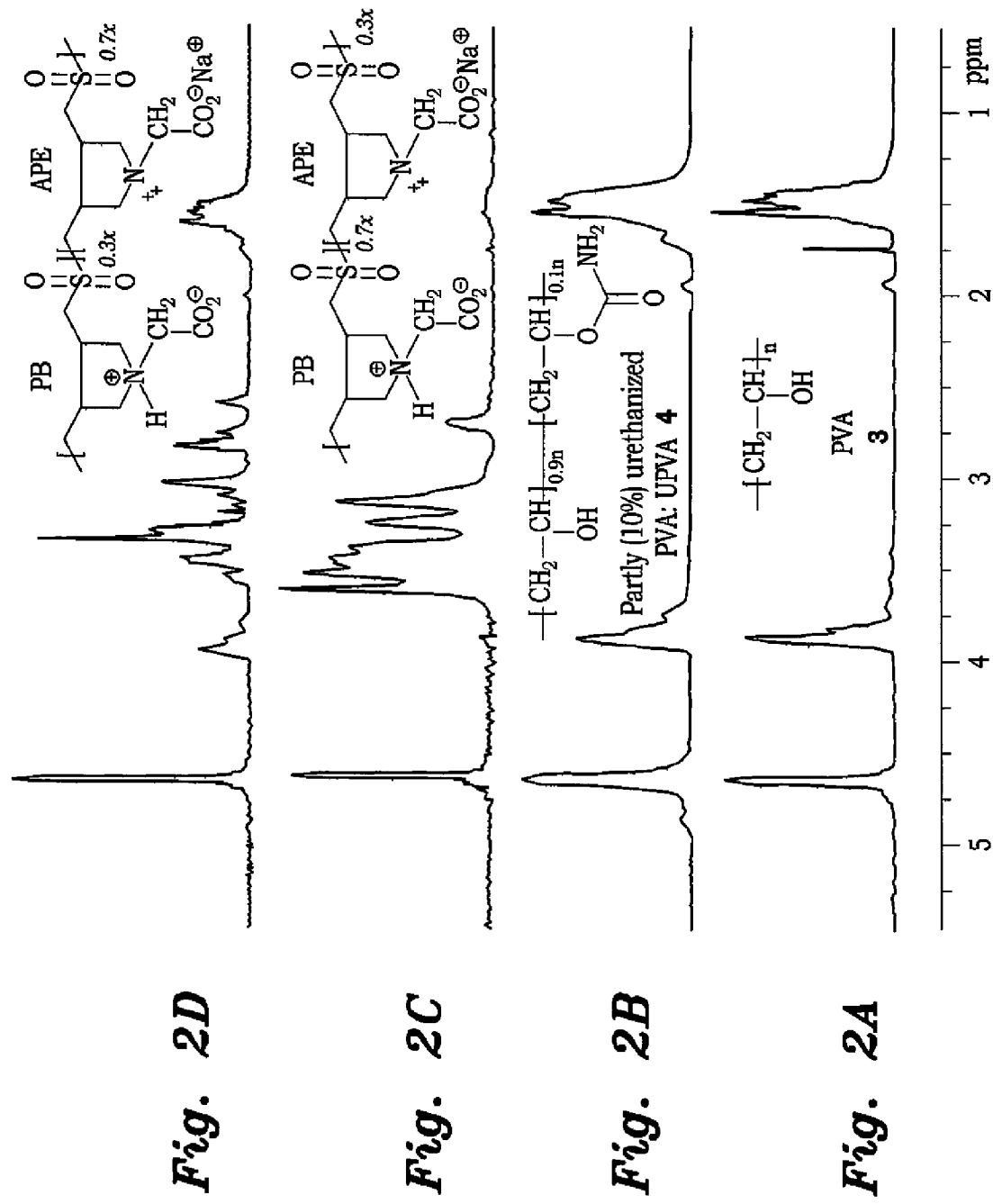
FIG. 2A is the $^1$H NMR spectrum of PVA 3.
FIG. 2B is the $^1$H NMR spectrum of the partly urethanized PVA (UPVA) 4.
FIG. 2C is the $^1$H NMR spectrum of the bottom phase, System 1: UPVA 4-[(70:30) PB/APE 2 $M_2$-0].
FIG. 2D is the $^1$H NMR spectrum of the top phase, System 4: UPVA 4-[(30:70) PB/APE 2-$M_2$-0].

The $^1H$ NMR signals for the polymers were well separated and the mole ratios of the repeating units of the polymers were easily calculated using the integration of the underlined two-proton multiplet ($\underline{H}_2CC$) at δ1.2-2.0 ppm for UPVA 4 (FIG. 2B) and the twelve-proton complex signals in the range δ2.5-3.7 for the polymers PB/APE 2 (i.e. CAS 1+1.3 or 1.7 equivalent NaOH) (FIGS. 2C and 2D). For UPVA 4, the underlined protons C$\underline{H}$OH and C$\underline{H}$OCONH$_2$ appeared at δ3.60-3.95 and ≥4.65 ppm, respectively (FIG. 2B). The later signal overlapped with the signal of HOD which also appeared at 4.65 ppm. For the area (A) under δ1.2-2.0 for $CH_2$ of UPVA 4, the area for a single H becomes (A/2). The PVA is urethanized to the extent of 10%, and as such the area of the non-urethanized i.e. PVA portion of C$\underline{H}$OH (90%) at δ3.60-3.95 should translate into (A/2)×0.90. Since this proton (C$\underline{H}$OH) signal overlaps with the signals of the NaOH-treated CAS 1 (i.e. PB/APE 2), the area (B) in the range δ2.5-4.0 ppm belongs to the 12 Hs of PB/APE 2 (i.e. CAS 1+NaOH) repeat unit and C$\underline{H}$O protons of non-urethanized PVA. So, the area of a single H for CAS becomes [B−(A/2)×0.90]/12. The mole ratio of CAS/UPVA (i.e. the ratio of area of single H of CAS and UPVA) thus becomes:

$$\frac{\text{mol } UPVA}{\text{mol } CAS} = \frac{\text{Area of }^1H \text{ of } UPVA}{\text{Area of }^1H \text{ for } CAS} \quad (1)$$

$$= \frac{A/2}{[B-(A/2)\times 0.9]/12}$$

$^1$H NMR measurements were used to determine the mole ratios. Tie lines were constructed for the systems shown in FIGS. 3A, 3B, 3C, 4A, 4B, 4C, 4D and 5A.

Weight percent of each polymer is determined by using the Equations 2 and 3 as described in Ali, S. A. et al., Polymer, 38, 3385 (1997):

$$[CAS_b] = \frac{UPVA_0/48.35 - (CAS_0/273.73)([UPVA]/[CAS])_t}{V_b\{([UPVA]/[CAS])_b - ([UPVA]/[CAS])_t\}} \quad (2)$$

where the subscripts t and b represent top and bottom phase, respectively; [CAS] and [UPVA] represent the concentrations of the repeating units in mmol of repeat unit cm$^{-3}$; CAS$_0$ and UPVA$_0$ represent total mass in mg of the polymers; and V represents the volume in cm$^3$. Molar masses of the repeat units of the CAS.H$_2$O 1-M$_2$-0 and UPVA 4 were taken as 273.73 and 48.35, respectively. Note that for CAS.H$_2$O 1-M$_2$-1 and 1-M$_2$-3, the respective molar masses of 274.65 and 276.50 were used. [UPVA]/[CAS] represents molar ratio of the polymers as determined by $^1$H NMR integration. The mass of the polymer CAS in the bottom phase is then calculated as:

$$CAS_b=[CAS_b]V_b\times 273.73 \text{ mg} \quad (3)$$

Once one of the polymer concentrations in a phase is known, then the concentration and weight percent of the polymers in the two phases are easily calculated from the known volume, density and mass of the two phases.

Binodals by the turbidity method is carried out as follows. About 1.5 g of a concentrated solution (~10% w/w) of CAS 1 (treated with 1.3 or 1.7 equivalents of NaOH) in 0.1 or 0.4 N NaCl and a known weight of a concentrated solution (~20% w/w) of the UPVA 4 (in 0.1 or 0.4 N NaCl) were taken in a flask and stirred with a magnetic stir bar until the transparent system turned turbid. Then a known weight of a 0.1 or 0.4 N NaCl solution was added dropwise until the system became transparent again. At this point, the final composition of the two polymers calculated corresponds to a point on the binodal curve. After obtaining the first point, a concentrated solution of UPVA 4 was added again to obtain a turbid suspension, and dilution with water (0.1 N NaCl) was repeated to obtain a second point on the binodal curve. This procedure was continued until a sufficient number of points for the construction of the binodal curve were obtained. In order to obtain points on the other end of the binodal curve, the concentrated solution of the UPVA was titrated with the CAS 1 (treated with 1.3 or 1.7 equiv NaOH) solution following the same procedure described above. Points obtained by the turbidity method are joined together in the phase diagrams. All experiments were carried out at 23° C.

The turbidity method is the easier method for constructing the binodals. However, when the turbidity method did not give a clear-cut visualization of a phase transition, the binodals were obtained by a dilution method. Binodals by the dilution method is carried out as follows. Systems with known total compositions were diluted with water (NaCl), a few drops at a time, and then allowed to separate into two phases. This process was continued until the two phases became one. The composition of the diluted system (before the last drop makes the system homogeneous) was determined, and these points, along with the composition determined by $^1$H NMR analyses as well as by turbidity methods, were used to construct the phase diagrams.

Cationic acid salt (CAS) 1 is pH-responsive due to the presence of an amino acid residue having an unquenched nitrogen valency. On treatment with 1 and 2 equivalents of NaOH, CAS 1 can be converted into (PB/APE) 2 with a PB/APE ratio of ~100:0 and ~0:100, respectively. Base treatment in the equivalent range 1<NaOH<2 is expected to generate polymers having varying proportions of PB and APE fractions in the polymer chain. While CAS 1 and (100:0 PB/APE) 2 were found to be almost insoluble in common solvents (including water), in the presence or absence of salt, the corresponding (0:100 PB/APE) 2 (i.e., APE 2) is water-soluble. As the APE fraction in 2 crosses the 20% limit, it becomes water-soluble.

The cationic acid salts (CAS) 1-M$_2$-0 and 1-M$_2$-3, for instance, indicate the presence of 0 and 3 mol %, respectively, of the hydrophobic repeat units (M$_2$) having a C$_{12}$ alkyl pendent as the hydrophobe. Phase compositions of several UPVA 4-[CAS-M$_2$-0 or 1-M$_2$-1 or 1-M$_2$-3+1.3 or 1.7 equivalents of NaOH]-H$_2$O (0.1 or 0.4 N NaCl) systems were determined using three different techniques, including the NMR, the turbidity method, and the dilution methods, as described above. Polymer concentrations of the two phases in equilibrium with each other, as determined by $^1$H NMR, are connected by tie lines. Turbidity and/or dilution methods are used to obtain the binodal curves.

In the presence of 1.3 and 1.7 equivalents of NaOH, CAS 1 is converted to polymer (70:30 PB/APE) 2 and (30:70 PB/APE) 2, respectively, having PB and APE fractions in a respective ratio of 70:30 and 30:70 (FIG. 1A). In the phase diagrams, the % w/w of the polymer, rich in the top phase, is assigned the y-axis, while the polymer rich in the bottom phase is assigned the x-axis. The polymers displayed segregative phase separation behavior. The binodal was found to be fairly symmetrical. Thus, the two polymers may have very similar hydrodynamic volumes. The phase separation happened at relatively low total polymer concentrations, much less than 10%. Phase separation at a low concentration could be useful from an industrial point of view. Several tie lines (1-4), shown in FIG. 3A, which connect the phases in equilibrium, are constructed by the NMR technique. The tie lines are helpful in constructing two phases with suitable volume ratio of the top and bottom phases. For instance, the total system represented by the point A$_{total}$ will have the top and bottom phase compositions, represented by A$_{top}$ and A$_{bottom}$, respectively, but the volume or the mass ratio of the top and bottom phases will be determined by the ratio of the lengths of A-A$_{bottom}$ and A-A$_{top}$.

Figure 3B:
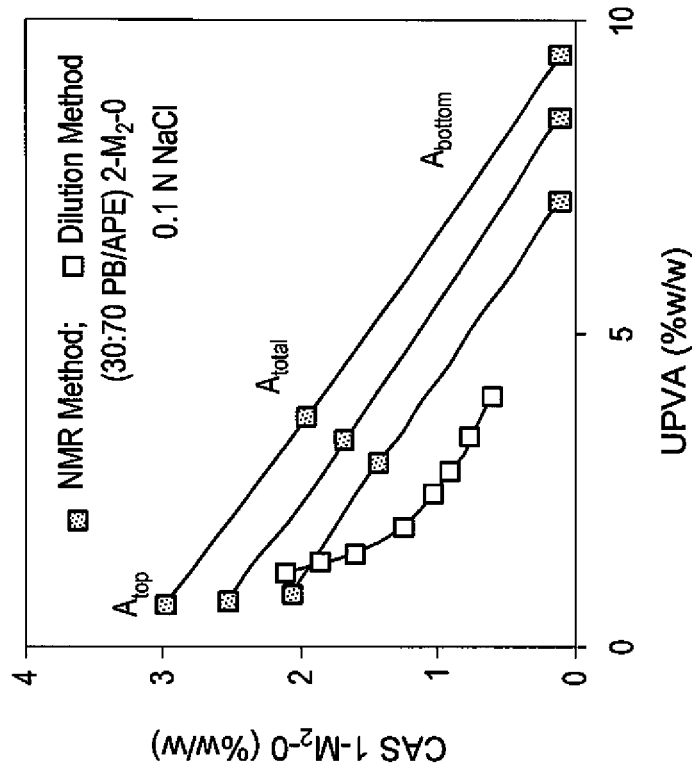
FIG. 3B is a phase diagram at 23° C. of UPVA 4-[CAS 1-$M_2$-0+1.7 equiv NaOH]-water (0.1 N NaCl).
Figure 3A:
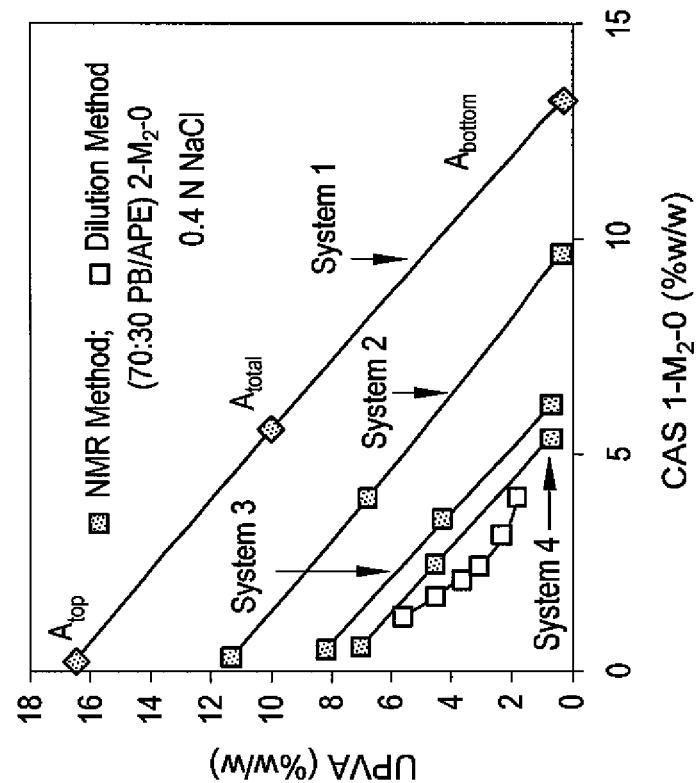
FIG. 3A is a phase diagram at 23° C. of UPVA 4-[CAS 1-$M_2$-0+1.3 equiv NaOH]-water (0.4 N NaCl).
Figure 3D:
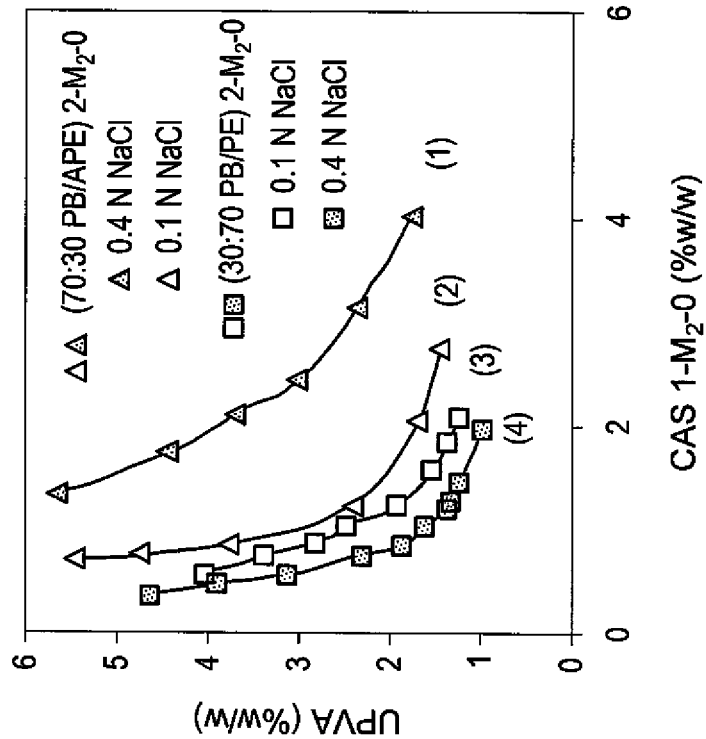
FIG. 3D is a phase diagram at 23° C. of UPVA 4-[CAS 1-$M_2$-0+1.3 or 1.7 equiv NaOH]-water (0.1 N and 0.4 N NaCl).
Figure 3C:
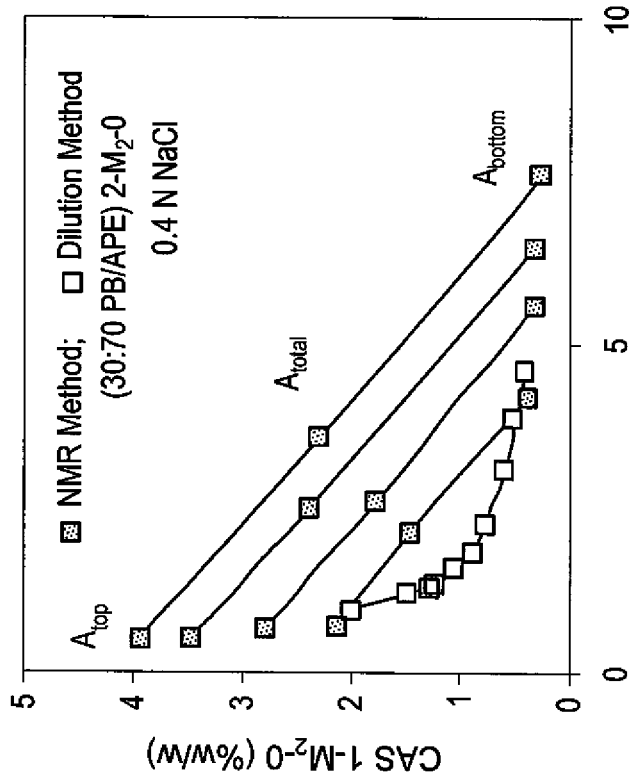
FIG. 3C is a phase diagram at 23° C. of UPVA 4-[CAS 1-$M_2$-0+1.7 equiv NaOH]-water (0.4 N NaCl).
Figure 4A:
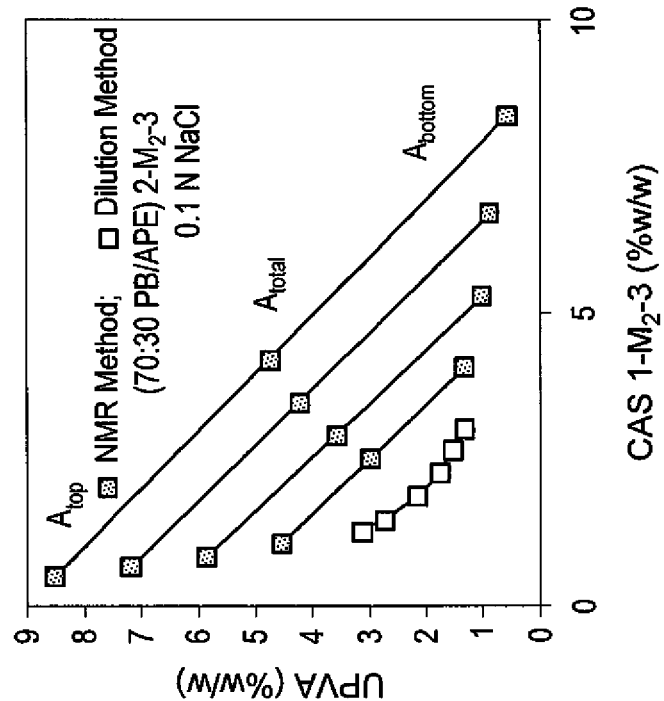
FIG. 4A is a phase diagram at 23° C. of UPVA 4-[CAS 1-$M_2$-1+1.3 equiv NaOH]-water (0.4 N NaCl).
Figure 4B:
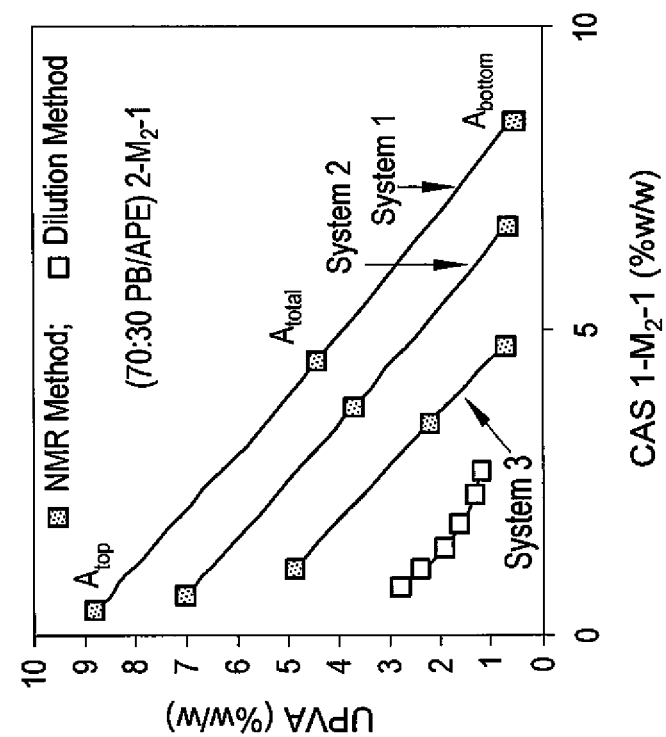
FIG. 4B is a phase diagram at 23° C. of UPVA 4-[CAS 1-$M_2$-3+1.3 equiv NaOH]-water (0.1 N NaCl).
Figure 4D:
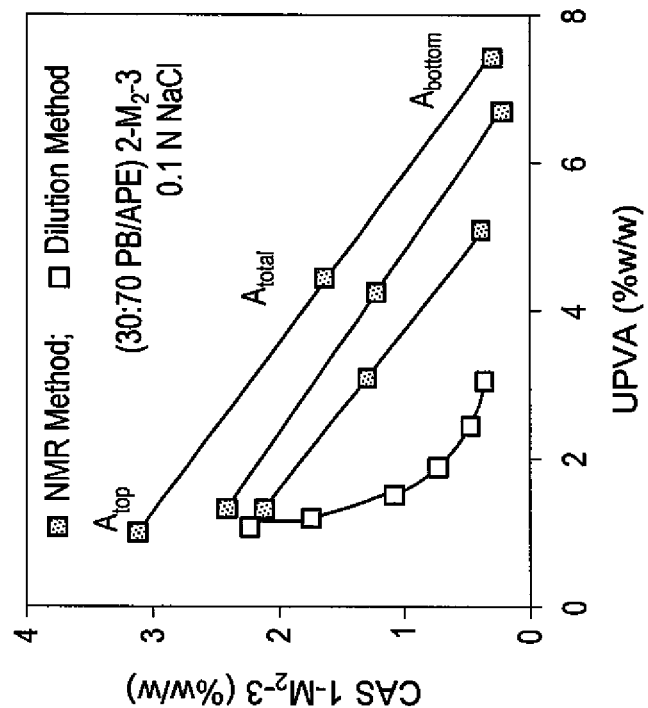
FIG. 4D is a phase diagram at 23° C. of UPVA 4-[CAS 1-$M_2$-3+1.7 equiv NaOH]-water (0.1 N NaCl).
Figure 4C:
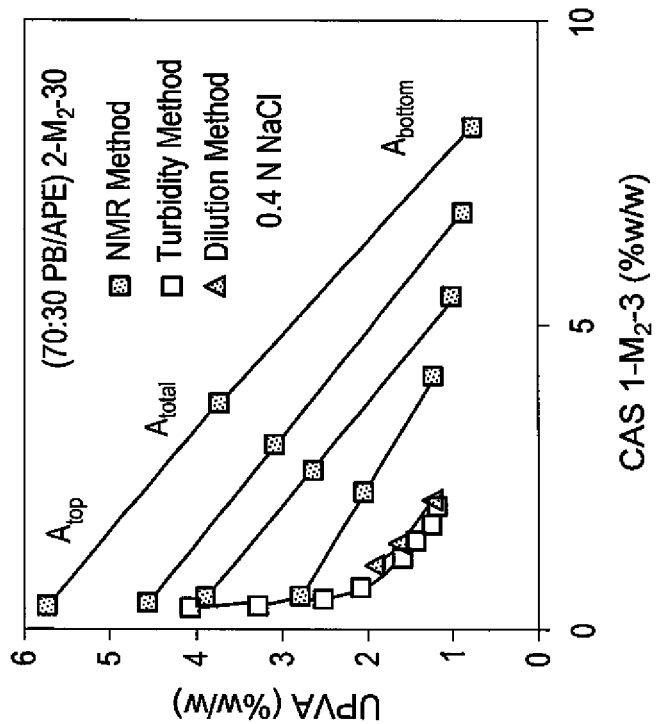
FIG. 4C is a phase diagram at 23° C. of UPVA 4-[CAS 1-$M_2$-3+1.3 equiv NaOH]-water (0.4 N NaCl).

Phase compositions of UPVA 4-[CAS 1-M$_2$-0+1.7 equiv NaOH]-H$_2$O in the presence of 0.1 N NaCl and 0.4 N NaCl are given in FIGS. 3B and 3C, respectively. It is interesting to note that a phase reversion was observed with the zwitterionic (betainic)-poor (30:70 PB/APE) 2 [FIGS. 3B and 3C], contrary to the systems having a zwitterionic-rich (70:30 PB/APE) 2 with a PB/APE ratio of 70:30 [FIG. 3A]. In this case, the top and bottom layers were found to be rich in (30:70 PB/APE) 2 M$_2$-0 (i.e. [CAS 1-M$_2$-0+1.7 equiv NaOH]) and UPVA 4, respectively [FIG. 3B or 3C].

The effects of NaCl concentration and the PB/APE ratio of polymer 2 on the binodal curves (obtained by dilution/turbidity methods) are displayed in FIG. 3D. For (70:30 PB/APE) 2-$M_2$-0, it is observed that the binodal curve shifts downward as the concentration of NaCl becomes lower [compare plot (1) vs. plot (2)], indicating that lower concentrations of the polymers are required to form the ATPS in 0.1 N NaCl than in 0.4 N NaCl. The 70% zwitterionic (betainic) and 30% anionic fractions in (70:30 PB/APE) 2-$M_2$-0 are expected to contribute to 'antipolyelectrolyte' and 'polyelectrolyte' behavior, respectively. The addition of small amounts of electrolytes (NaCl, etc.) to the solution of simple linear polyelectrolytes is thought to lead to a Debye-Hückel shielding effect that permits the polymer to adopt a more entropically favored, compact conformation. The opposite behavior is typical for aqueous solutions of polyampholytes/polybetaines. The opposite charges of the zwitterionic species along the backbone tend to self-neutralize the chain and cause it to collapse under attractions between the opposite charges. Addition of a small electrolyte (like NaCl) tends to disrupt the zwitterionic interaction, and thus results in the increase of hydrodynamic volume (anti-polyelectrolyte effect). Since the polymer (70:30 PB/APE) 2-$M_2$-0 has a higher degree of zwitterionic (70%) than anionic character (30%), it is expected to demonstrate overall antipolyelectrolyte behavior upon the addition of NaCl. As the concentration of the added salt increases, the chain expansion increases. Thus, an increased hydrodynamic volume of the polymer (70:30 PB/APE) 2-$M_2$-0 in 0.4 N NaCl, makes it more compatible with the UPVA 4, and therefore higher amounts of polymers are required for phase separation to occur. The above rationale gets credence from the observed intrinsic viscosity values. The intrinsic viscosity [η] of UPVA 4 at 30° C. in water was determined as 0.760 dL/g, whereas for polymer 2 having PB/APE ratios of 70:30, 30:70 and 0:100 at 30° C. in 0.1 N NaCl, the [η] values were found to be 0.175, 0.603 and 0.967 dL/g, respectively. Since it is well known that hydrodynamic volume of polymers in solution is directly proportional to their [η]s, it can be deduced that the dominance of the zwitterionic fragments PB causes the polymer chains to assume a more compact structure for a PB/APE ratio of 70:30. UPVA 4 is thus expected to have a much higher hydrodynamic volume than (70:30 PB/APE) 2-$M_2$-0. The degree of the size asymmetry is expected to diminish in 0.4 N NaCl as a result of the coil expansion of the ionic polymer, thereby making the polymer pair more compatible.

As the PB/APE ratio in 2-$M_2$-0 was changed from 70:30 to 30:70, the binodals moved downwards both in 0.1 and 0.4 N NaCl [FIG. 3D: plot (3) and (4)]. This change of ratio in favor of APE fraction is associated with an increase of the intrinsic viscosity. Polymer (30:70 PB/APE) 2-$M_2$-0 is thus expected to have a much higher hydrodynamic volume as well as net negative charges than a sample of (70:30 PB/APE) 2. The higher net negative charges are responsible for moving the binodals downward, thus making it less compatible with the neutral polymer UPVA 4. Increasing the salt concentration to 0.4 N causes a contraction of the polymer chain, since it is dominated by anionic motifs. Lower hydrodynamic volume of polymer (30:70 PB/APE) 2 in 0.4 N than in 0.1 N NaCl makes the polymer less compatible with the UPVA 4. and therefore it requires a lesser amount of polymers for phase separation to occur.

The effects of the presence of hydrophobe and its proportion on the binodals are demonstrated in FIGS. 4A-4D and FIG. 5A using UPVA 4-[PB/APE 2-$M_2$-1]- and UPVA 4-[PB/APE 2-$M_2$-3]-$H_2O$ (0.1 and 0.4 N NaCl). As anticipated, the top and bottom layers were found to be overwhelmingly rich in UPVA 4 and (70:30 PB/APE) 2-$M_2$-1 or 2-$M_2$-3, respectively, [FIGS. 4A-4C]. Note that, in the presence of zwitterionic-poor (30:70 PB/APE) 2, a phase reversion was observed. For the UPVA 4-[30:70 PB/APE] 2-$M_2$-3 system, while the top layer was rich in (PB/APE 2-$M_2$-3) in 0.1 N NaCl [FIG. 4D], UPVA 4 preferred the top phase in 0.4 N NaCl [FIG. 5A].

Figure 5B:
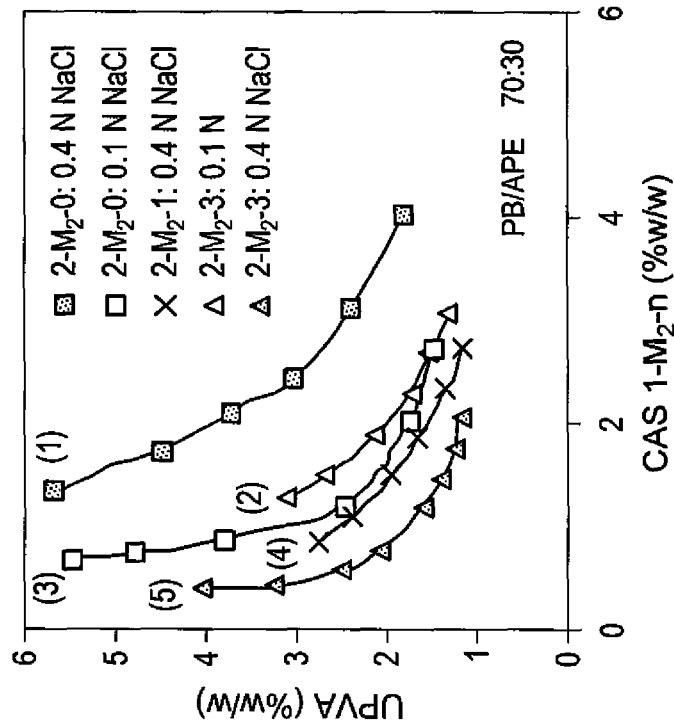
FIG. 5B is a phase diagram at 23° C. of UPVA 4-[CAS 1-$M_2$-n+1.3 equiv NaOH]-water (0.1 and 0.4 N NaCl).
Figure 5A:
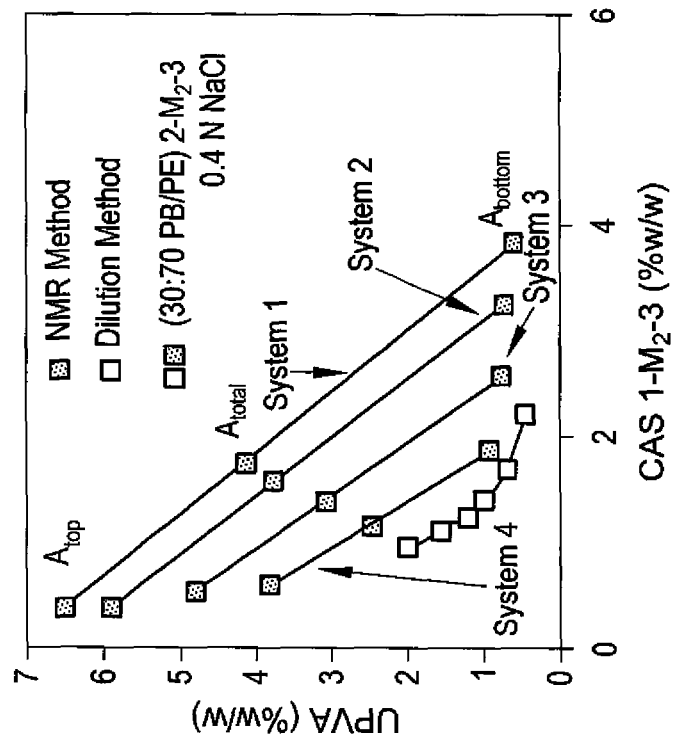
FIG. 5A is a phase diagram at 23° C. of UPVA 4-[CAS 1-$M_2$-3+1.7 equiv NaOH]-water (0.4 N NaCl).
Figure 5D:
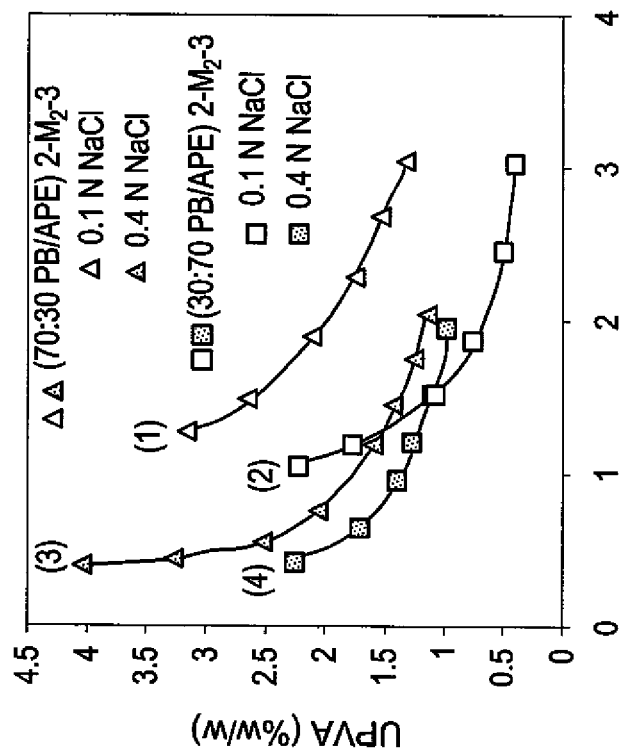
FIG. 5D is a phase diagram at 23° C. of UPVA 4-[CAS 1-$M_2$-3+1.3 or 1.7 equiv NaOH]-water (0.1 and 0.4 N NaCl).
Figure 5C:
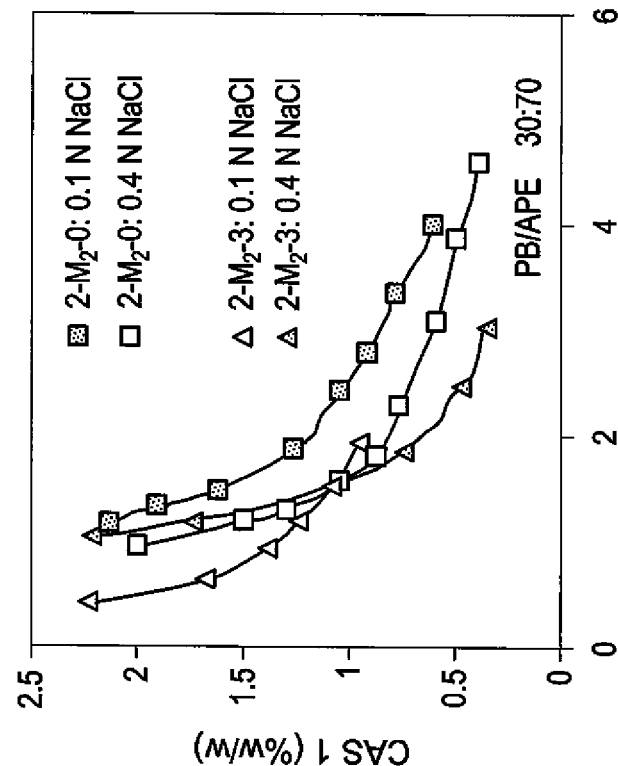
FIG. 5C is a phase diagram at 23° C. of UPVA 4-[CAS 1-$M_2$-n+1.7 equiv NaOH]-water (0.1 and 0.4 N NaCl).
Figure 6A:
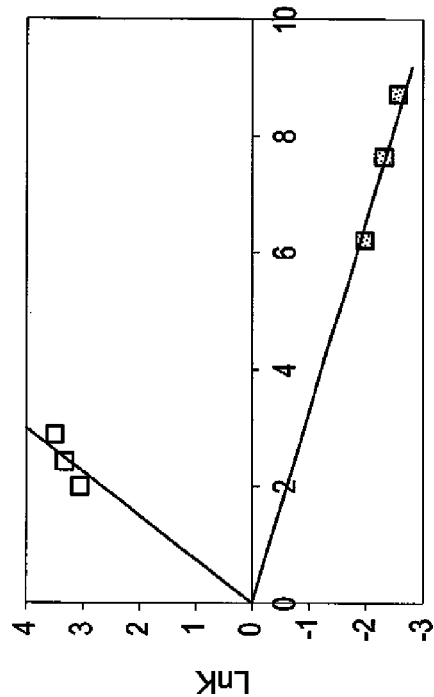
FIG. 6A is a diagram showing correlation of the phase diagrams of CAS 1-UPVA 4-water (NaCl) systems using the method of Diamond and Hsu: using tie-line data from FIG. 3A.
Figure 6B:
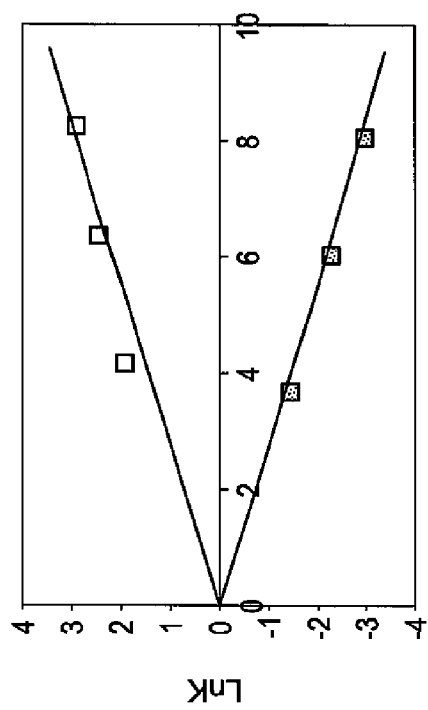
FIG. 6B is a diagram showing correlation of the phase diagrams of CAS 1-UPVA 4-water (NaCl) systems using the method of Diamond and Hsu: using tie-line data from FIG. 3B.
Figure 6C:
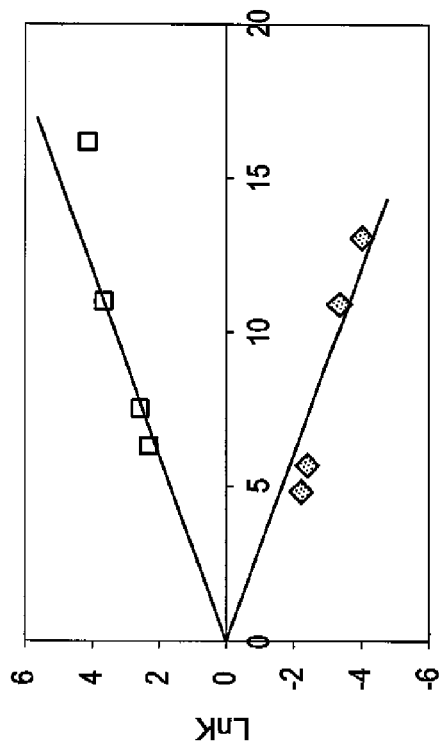
FIG. 6C is a diagram showing correlation of the phase diagrams of CAS 1-UPVA 4-water (NaCl) systems using the method of Diamond and Hsu: using tie-line data from FIG. 3C.
Figure 6D:
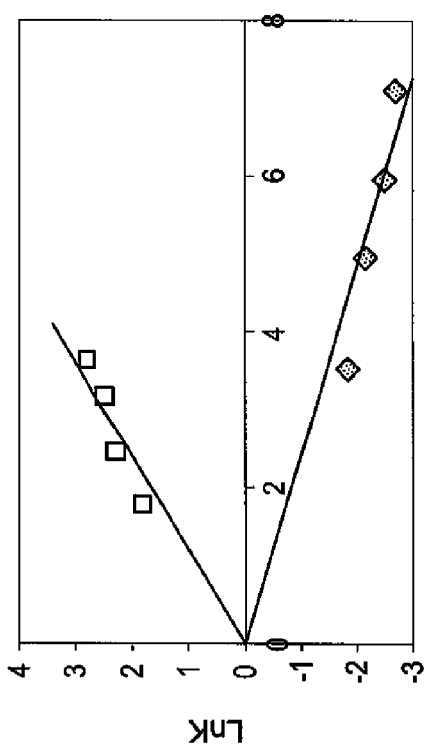
FIG. 6D is a diagram showing correlation of the phase diagrams of CAS 1-UPVA 4-water (NaCl) systems using the method of Diamond and Hsu: using tie-line data from FIG. 3D.
Figure 7A:
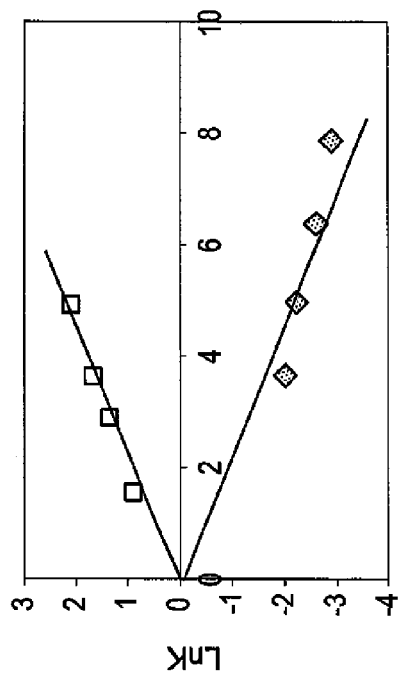
FIG. 7A is a diagram showing correlation of the phase diagrams of CAS 1-UPVA 4-water (NaCl) systems using the method of Diamond and Hsu: using tie-line data from FIG. 4A.
Figure 7B:
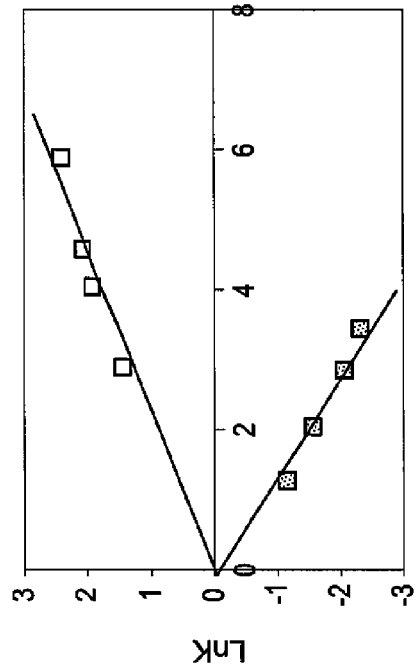
FIG. 7B is a diagram showing correlation of the phase diagrams of CAS 1-UPVA 4-water (NaCl) systems using the method of Diamond and Hsu: using tie-line data from FIG. 4B.
Figure 7C:
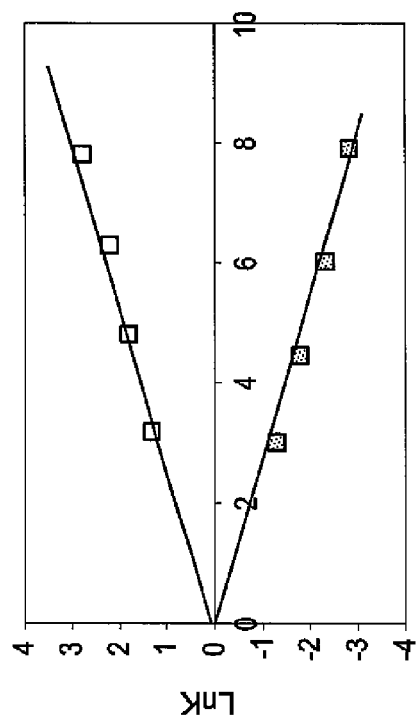
FIG. 7C is a diagram showing correlation of the phase diagrams of CAS 1-UPVA 4-water (NaCl) systems using the method of Diamond and Hsu: using tie-line data from FIG. 4C.
Figure 7D:
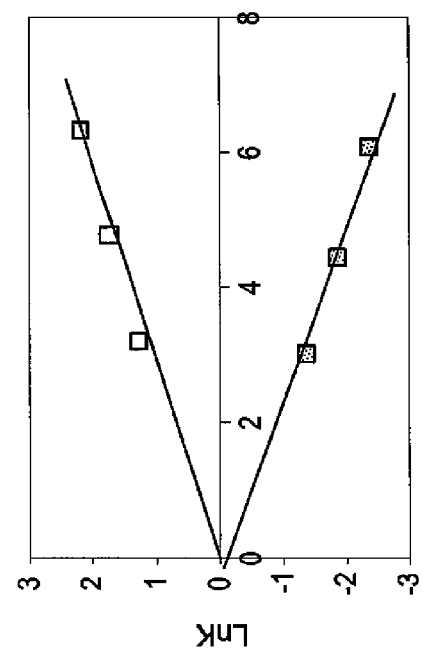
FIG. 7D is a diagram showing correlation of the phase diagrams of CAS 1-UPVA 4-water (NaCl) systems using the method of Diamond and Hsu: using tie-line data from FIG. 4D.

The effects of NaCl concentration, the PB/APE ratio and hydrophobe content in polymer PB/APE 2 (obtained from CAS 1 treated with NaOH) on the binodal curves (obtained by dilution/turbidity methods) are displayed in FIGS. 5B-5D. As discussed before, for (70:30 PB/APE) 2-$M_2$-0 (containing 0 mol % hydrophobe), the binodal curve shifted downward as the concentration of NaCl became lower [FIG. 5B: plots (1) vs. (3)]. The opposite trend was observed for (70:30 PB/APE) 2-$M_2$-3 (containing 3 mol % hydrophobe)—the binodal shifted downward as the concentration of NaCl became higher [FIG. 5B: plot (2) vs. (5)]. Note that the presence of the hydrophobe also shifted the binodal downward. For the system containing the highest proportion of the hydrophobe, i.e., 2-$M_2$-3, the binodal was shifted the most [FIG. 5B: cf. plots (1), (4), and (5)]. For CAS 1 systems treated with 1.7 equivalents of NaOH, the presence of hydrophobe was also found to shift the binodals downward [FIG. 5C], For the systems containing (30:70 PB/APE) 2-$M_2$-3, the binodals [FIG. 5D: plots (2) and (4)] were shifted downward, compared to the systems having a PB/APE ratio of 70:30 [FIG. 5D: plots (1) and (3)] both in 0.1 and 0.4 N NaCl. The presence of the hydrophobe and higher amounts of APE fractions, thus, make it less compatible with the UPVA 4, hence requiring lesser amounts of polymers for phase separation to occur. The well-known effects of NaCl on hydrophobic association dictate that the presence of added salt makes the aqueous system more hostile to the hydrophobes, and thereby forces them to associate intermolecularly. The hydrophobic moieties in the polymer molecules can undergo interchain associations to form an extended structure with a large molecular size. The formation of the physical network facilitates the incompatibility of the hydrophobically modified polymer (PB/APE) 2-$M_2$-3 with UPVA 4. Hence, phase separation occurs at lower concentrations of the polymers.

The consistency of the tie-lines of the [NaOH-treated CAS 1]-UPVA 4-water (NaCl) systems was checked using the following correlation developed by Diamond and Hsu, *Correlation of Polymer Partitioning in Aqueous Two-Phase Systems*, AIChE Symposium Series, 88, (#290), 105 (1992) based on Florey-Huggins theory:

$$\ln K_1 = A_1(w''_1 - w'_1)$$

and $$\ln K_2 = A_2(w''_2 - w'_2)$$

where w" and w' are the polymer weight percent in the top and bottom phase, respectively, the slopes $A_1$ and $A_2$ are functions of the polymer molecular weight and the interactions between the polymers and water, $K_1$ and $K_2$ represent the partition coefficient ($C_t/C_b$) of the polymer between the top and bottom phase, and the subscripts 1 and 2 represent polymer 1 (PB/APE 2) and polymer 2 (UPVA 4). The correlation results are shown in FIGS. 6A, 6B, 6C, 6D, 7A, 7B, 7C and 7D. Straight lines were obtained, indicating satisfactory representation of the phase behavior by this model.

Partly urethanized polyvinyl alcohol (UPVA) has been introduced as a phase forming polymer for the first time. Cationic acid salt (CAS) polymers 1, with and without hydrophobic modification, were used to construct ATPS and study the effects of hydrophobic modification on the phase behaviors. One of the most gratifying aspect of CAS 1 is that it has almost zero solubility in water below pH~7 in the presence or absence of added salt, thus making it a suitable candidate for industrial applications, since the solubility behavior will permit its effective removal from solution by precipitation. The hydrophobicity, hydrophilicity, and the hydrodynamic volume of the polymer 2 can be controlled by the degree of protonation of the pH-responsive amine functionality and by hydrophobic modification. The presence of hydrophobe, as well as the increasing amount of anionic fractions in the polymer 2 chain, was found to make the polymer less compatible with UPVA 4, thereby requiring lesser amount of polymers for phase separation to occur. Hydrophobicity is a key factor that determines the partitioning of proteins in ATPS. The phase separation takes place at relatively low total polymer concentrations, much less than 10%, which could be useful from an industrial point of view.

It is to be understood that the present invention is not limited to the embodiments described above, but encompasses any and all embodiments within the scope of the following claims.

I claim:

1. An aqueous two-phase system, comprising an aqueous solution containing a first phase including partly urethanized polyvinyl alcohol (UPVA) and a second phase including a pH-responsive, hydrophobically modified cyclocopolymer formed from the monomers diallylammonioethanoate, sulphur dioxide, and up to 3 mol % dodecyldiallylammonium chloride.

2. The aqueous two-phase system according to claim 1, wherein the molar percentage of dodecyldiallylammonium chloride is 0%.

3. The aqueous two-phase system according to claim 1, wherein the molar percentage of dodecyldiallylammonium chloride is 1%.

4. The aqueous two-phase system according to claim 1, wherein the molar percentage of dodecyldiallylammonium chloride is 3%.

5. The aqueous two-phase system according to claim 1, wherein the partly urethanized polyvinyl alcohol (UPVA) is 10% urethanized.

6. A method for the synthesis of the aqueous two-phase system of claim 1, comprising mixing, in the presence of NaOH, NaCl solution, and water, partly urethanized polyvinyl alcohol (UPVA) with the cationic acid salt (CAS) 1 of the structure:

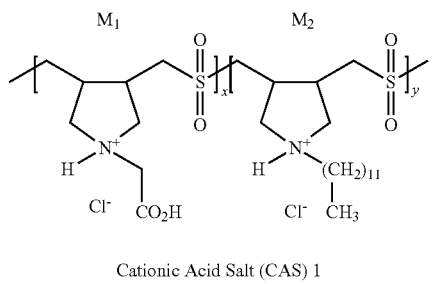

Cationic Acid Salt (CAS) 1 wherein x and y are selected so that:
when x is 1, y is 0;
when x is 0.99, y is 0.01; and
when x is 0.97, y is 0.03.

7. The method for forming an aqueous two-phase system according to claim 6, wherein 1.3 equivalents of NaOH are used.

8. The method for forming an aqueous two-phase system according to claim 6, wherein 1.7 equivalents of NaOH are used.

9. The method for forming an aqueous two-phase system according to claim 6, wherein the concentration of the NaCl solution is 0.1N.

10. The method for forming an aqueous two-phase system according to claim 6, wherein the concentration of the NaCl solution is 0.4N.

* * * * *